US008125475B2

(12) United States Patent
Choi

(10) Patent No.: US 8,125,475 B2

(45) Date of Patent: Feb. 28, 2012

(54) DATA DRIVER AND FLAT PANEL DISPLAY USING THE SAME

(75) Inventor: Byong-Deok Choi, Suwon-si (KR)

(73) Assignee: Samsung Mobile Display Co., Ltd., Giheung-Gu, Yongin, Gyunggi-Do (KR)

( * ) Notice: Subject to any disclaimer, the term of this patent is extended or adjusted under 35 U.S.C. 154(b) by 1063 days.

(21) Appl. No.: 12/068,105

(22) Filed: Feb. 1, 2008

(65) Prior Publication Data

US 2008/0186295 A1 Aug. 7, 2008

(30) Foreign Application Priority Data

Feb. 2, 2007 (KR) ........................ 10-2007-0011012

(51) Int. Cl.
*G06F 3/038* (2006.01)

(52) U.S. Cl. ........................................................ 345/208

(58) Field of Classification Search ........................ None
See application file for complete search history.

(56) References Cited

U.S. PATENT DOCUMENTS

| | | | | |
|---|---|---|---|---|
| 3,696,394 | A * | 10/1972 | Kashio | 345/18 |
| 2005/0001803 | A1 * | 1/2005 | Morita et al. | 345/89 |
| 2006/0071897 | A1 * | 4/2006 | Moon | 345/98 |

FOREIGN PATENT DOCUMENTS

| | | |
|---|---|---|
| JP | 05-143022 | 6/1993 |
| KR | 100205385 | 4/1999 |
| KR | 10-2002-0090792 | 12/2002 |
| KR | 10-2005-0006331 | 1/2005 |
| KR | 10-2005-0045168 | 5/2005 |

OTHER PUBLICATIONS

*Notice of Allowance* from the KIPO issued in Applicant's corresponding Korean Patent Application No. 2007-0011012 dated May 28, 2008.

* cited by examiner

*Primary Examiner* — Alexander Eisen
*Assistant Examiner* — Matthew Yeung
(74) *Attorney, Agent, or Firm* — Robert E. Bushnell, Esq.

(57) ABSTRACT

Disclosed is a data driver including a holding latch and a digital-analog converter. The data driver includes a holding latch for storing data and for generating a counting signal corresponding to the value of the stored data. A digital-analog converter receives ramp pulses from an external apparatus, and controls supply time of the ramp pulses according to the counting signals. A voltage level of a data signal that is supplied to a pixel unit of a flat panel display is determined by the output of the digital-analog converter.

23 Claims, 9 Drawing Sheets

DATA DRIVER AND FLAT PANEL DISPLAY USING THE SAME

CLAIM OF PRIORITY

This application makes reference to, incorporates the same herein, and claims all benefits accruing under 35 U.S.C. §119 from an application for DATA DRIVER AND FLAT PANEL DISPLAY USING THE SAME earlier filed in the Korean Intellectual Property Office on 2 Feb. 2007 and there duly assigned Serial No. 10-2007-0011012.

BACKGROUND OF THE INVENTION

1. Field of the Invention

The present invention relates to a data driver of a flat panel display and a flat panel display including the data driver, and more particularly to a data driver for storing data and including a holding latch performing a function as a counter, and a flat panel display using the same.

2. Description of the Related Art

Recently, various flat plate displays capable of reducing weight and volume, which are disadvantages of cathode ray tubes (CRT), have been developed. Flat panel displays include liquid crystal displays (LCD), field emission displays (FED), plasma display panels (PDP), and organic light emitting displays.

Among the flat panel displays, a liquid crystal display displays images by controlling transmission of light generated from an external back light. Through development of the technology, a liquid crystal display with a large screen area having a high resolution has been developed, and accordingly has been used in various applications. An organic light emitting display displays images through an organic light emitting diode, which generates light by recombination processes of electrons and holes. Since the organic light emitting display has a fast response speed and is driven with low power consumption, it comes into the spotlight as the next generation display.

Each of the liquid crystal display and the organic light emitting display includes pixels, a data driver, and a scan driver. The pixels are defined at intersections of scan lines and data lines. The data driver is coupled to the data lines. The scan driver is coupled to the scan lines. The scan driver sequentially supplies a scan signal to the scan lines sequentially selecting pixels in a scan line. The data driver supplies a data signal to the data lines being synchronized with the scan signal. Accordingly, the data signal is supplied to pixels selected by the scan signal, and images of predetermined luminance are displayed according to the supplied data signal.

The data driver uses a digital-analog converter to convert external digital data into predetermined voltage levels, which can be referred to as a data signal. However, because the digital-analog converter includes a plurality of resistors and switches, it requires larger size and its manufacturing cost is high. In order to solve the problems, a method for generating a ramp pulse and supplying the ramp pulse to a data line at predetermined time as a data signal, has been suggested.

FIG. 1 is a diagram schematically showing a structure of a data driver for supplying a data signal using a ramp pulse. With reference to FIG. 1, the data driver includes a holding latch unit 10 and a data signal generator 20. The holding latch unit 10 stores data. The data signal generator 20 generates a data signal corresponding to the data stored in the holding latch unit 10. The holding latch unit 10 includes holding latches 12*a*, 12*b*, 12*c*, etc. for storing data supplied from an external apparatus, for example, a sampling latch unit. Each of the holding latches 12*a*, 12*b*, 12*c*, etc. forms an independent channel, stores data, and supplies the stored data to the data signal generator 20.

The data signal generator 20 includes counters 22*a*, 22*b*, 22*c*, etc., and first transistors M1*a*, M1*b*, M1*c*, etc. The counters 22*a*, 22*b*, 22*c*, etc. are disposed at separate channels. The first transistors M1*a*, M1*b*, M1*c*, etc. are coupled to the counters 22*a*, 22*b*, 22*c*, etc., respectively. Each of the counters 22*a*, 22*b*, 22*c*, etc. generates a counting signal, and provides the counting signal to the coupled first transistor. The start of the counting signal is synchronized with the start of the supply of the data to the counter. The counting signal is continuously generated for a time period that corresponds to the value of the data supplied to the counter. The generation of the counting signal stops after the time period determined by the value of the data.

When the counting signal is supplied, the first transistors M1*a*, M1*b*, M1*c*, etc. are turned on to provide a ramp pulse from an external apparatus to an output terminal OUT1 for a data signal. Because a stop time of the counting signal is determined by the value of the data, a data signal can be generated corresponding to the value of the data.

FIG. 2A shows graphs illustrating an operation of a first counter 22*a*, and FIG. 2B shows graphs illustrating an operation of a second counter 22*b*. With reference to FIG. 2A and FIG. 2B, the first counter 22*a* receives data of "00000100" (represented in a binary numeral system), and the second counter 22*b* receives data of "11010000." When the first counter 22*a* receives data of "00000100", it generates a counting signal counting from "00000000" to "00000100." While the counting signal is supplied to the first-first transistor M1*a*, the transistor M1*a* is being turned on. If the supply of the counting signal stops, the first-first transistor M1*a* is turned off. A time period for turning on the first-first transistor M1*a* is determined by the value of the data supplied to the first counter 22*a*. Accordingly, through the ramp pulse, voltage levels corresponding to the value of the data is provided. A capacitor (not shown), which is connected to the transistor, holds the charges supplied during the time period for turning on the transistor, and outputs voltage for a data signal through its output terminal OUT. The capacitor can be a parasitic capacitor.

When the second counter 22*b* receives data of "11010000," it generates a counting signal counting from "00000000" to "11010000." While the counting signal is supplied to the second-first transistor M1*b*, the second-first transistor M1*b* is being turned on. If the supply of the counting signal stops, the second-first transistor M1*b* is turned off. A time period for turning on the second-first transistor M1*b* is determined by the value of the data supplied to the second counter 22*b*. Accordingly, through the ramp pulse, voltage levels corresponding to the value of the data is provided to the output terminal OUT as a data signal.

However, this data driver requires counters 22*a*, 22*b*, 22*c*, etc. for every channel, and therefore the circuit for the data driver is complicated, and a mounting area increases.

SUMMARY OF THE INVENTION

Accordingly, it is an aspect of the present invention to provide a data driver that stores data and includes a holding latch that also performs a function as a counter, and a flat panel display using the same.

The foregoing other aspects of the present invention are achieved by providing a data driver including a holding latch for receiving data for the data driver and for receiving a control signal, and a digital-analog converter for receiving a ramp pulse and the counting signal. The holding latch stores the data and outputs a counting signal that is generated according to the value of the data. The digital-analog converter determines a voltage level of the data signal by cropping the ramp pulse during a period for which the counting signal is supplied.

The holing latch includes a plurality of logic units. Each of the logic units receives, through an input terminal, a bit value the data, and has an output terminal and an inversion output terminal. Each of the logic units operates as a D flip-flop or a T flip-flop depending on the control signal.

Each of the logic units may include a flip-flop unit, a first logic gate, and a first demultiplexer being coupled to an output terminal of the first logic gate and the input terminal of the each of the logic units. A first input terminal of the first logic gate is coupled to an output terminal of the flip-flop unit. A second input terminal of the first logic gate is coupled to the input terminal of the each of the logic units. The first demultiplexer outputs an output from the first logic gate or an output from the input terminal of the each of the logic units depending on a polarity of the control signal. An output terminal of the first demultiplexer is coupled to the flip-flop unit. The first demultiplexer can be switched to output the output from the input terminal of the each of the logic units if the control signal includes a second polarity. The first demultiplexer can be switched to output the output from the output terminal of the first logic gate if the control signal includes a first polarity. The first logic gate includes an exclusive OR gate. Each of the logic unit stores the bit value of the data if the control signal includes the second polarity. The holding latch outputs a counting signal if the control signal includes the first polarity.

The holding latch may further include a second switch, a first-first switch, a second-first switch, a first-second logic gate, a second-second logic gate, a first-third logic gate, a second-third logic gate, and a fourth logic gate. The second switch is coupled to an input terminal of a first one of the logic units, and the input terminal of the first one of the logic units receives the bit value through the second switch. The first-first switch is coupled between the inversion output terminal of the first one of the logic units and an input terminal of a second one of the logic units. The first-first switch is turned on if the control signal includes a first polarity. The second-first switch is coupled between the inversion output terminal of the second one of the logic units and an input terminal of a third one of the logic units. The second-first switch is turned on if the control signal includes a first polarity. The first-second logic gate is coupled between the inversion output terminal of the first one of the logic units and the first-first switch. The second-second logic gate is coupled between the inversion output terminal of the second one of the logic units and the second-first switch. The first-third logic gate is coupled to an output terminal of the first one of the logic units and to an output terminal of a fourth one of the logic units. The second-third logic gate is coupled to the output terminal of the second one of the logic units and to the output terminal of the third one of the logic units. The fourth logic gate is coupled to an output terminal of the first-third logic gate and to an output terminal of the second-third logic gate.

The first-second logic gate having a first input terminal and a second input terminal. The first input terminal of the first-second logic gate is coupled to the inversion output terminal of the first one of the logic units, and the second input terminal of the first-second logic gate is coupled to an inversion output terminal of the fourth one of the logic units. The first-second logic gate has an output terminal that is coupled to the first-first switch, and the first-second logic gate includes an AND gate.

The holding latch further include a third-first switch coupled between an input terminal of a fourth one of the logic units and a power source. The third-first switch is turned on if the control signal includes a first polarity.

The second-second logic gate has a first input terminal and a second input terminal. The first input terminal of the second-second logic gate is coupled to the inversion output terminal of the second one of the logic units, and the second input terminal of the second-second logic gate is coupled to the input terminal of a second one of the logic units. The second-second logic gate has an output terminal that is coupled to the second-first switch, and the second-second logic gate includes an AND gate.

Each of the first-third logic gate and the second-third logic gate includes a NOR gate, and the fourth logic gate includes a NAND gate. The fourth logic gate generates the counting signal if the control signal includes the first polarity.

The holding latch may further include a fifth logic gate for receiving an output from an output terminal of the fourth logic gate and for receiving a clock signal, and a second demultiplexer for receiving an output from a power source and an output of the fifth logic gate. The second demultiplexer receives a start signal, and outputs the output from the power source or the output of the fifth logic gate to the flip-flop unit included in the first one of the logic units depending on the start signal. The fifth logic gate including an AND gate. The start signal is supplied to the second demultiplexer during a time period in which the second switch is being turned on. The second demultiplexer outputs the output from the power source while the start signal is supplied, and outputs the output of the fifth logic gate if the start signal is not supplied.

BRIEF DESCRIPTION OF THE DRAWINGS

A more complete appreciation of the invention and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF THE INVENTION

Figure 1:
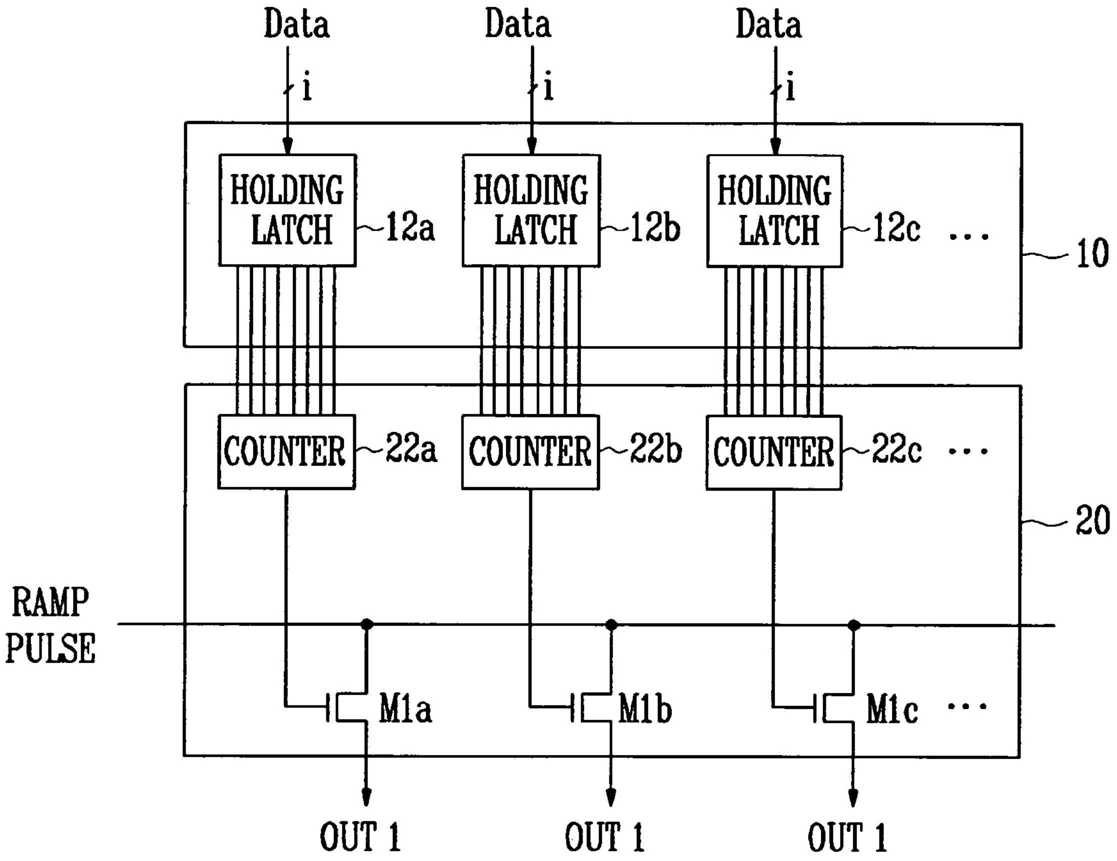
FIG. 1 is a diagram schematically showing a structure of a data driver that supplies a data signal using a ramp pulse.

Hereinafter, certain exemplary embodiments according to the present invention will be described with reference to the accompanying drawings. Here, when a first element is described as being coupled to a second element, the first element may be not only directly coupled to the second element but may also be indirectly coupled to the second element via a third element. Further, elements that are not essential to the complete understanding of the invention are omitted for clarity. Also, like reference numerals refer to like elements throughout.

Figure 3:
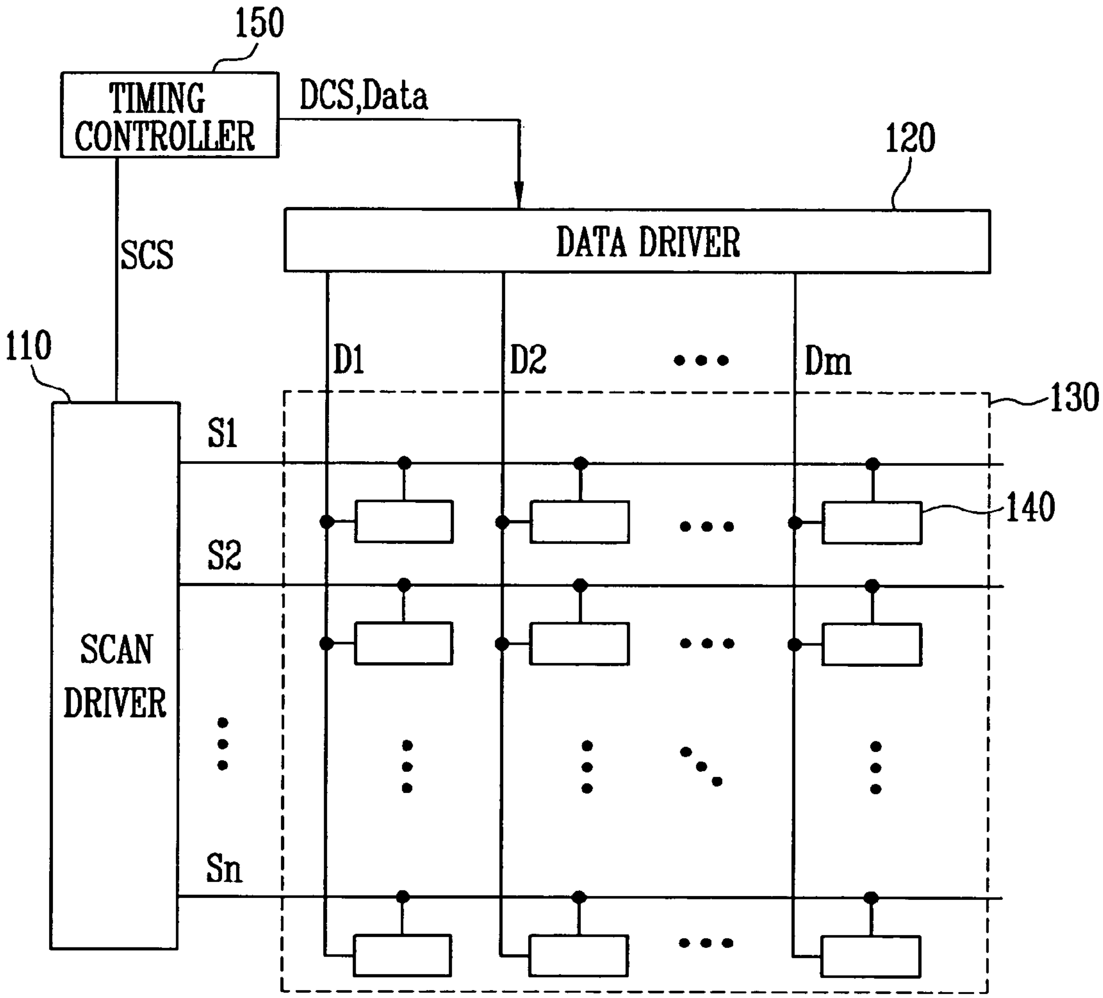
FIG. 3 is a diagram of a flat panel display constructed as an embodiment of the present invention.

FIG. 3 shows a diagram of a flat panel display constructed as an embodiment of the present invention. With reference to FIG. 3, the flat panel display of the embodiment of the present invention includes a pixel unit 130, a scan driver 110, a data driver 120, and a timing controller 150. The pixel unit 130 includes pixels 140, which are disposed at intersections of scan lines S1 to Sn and data lines D1 to Dm. The pixel unit displays images. The scan driver 110 is coupled to the scan lines S1 to Sn. The data driver 120 is coupled to the data lines D1 to Dm. The timing controller 150 controls the scan driver 110 and the data driver 120.

The scan driver 110 receives a scan drive control signal SCS from the timing controller 150. When the scan driver 110 receives the scan drive control signal SCS, it generates scan signals and sequentially supplies the scan signals to the scan lines S1 to Sn.

The data driver 120 receives a data drive control signal DCS and data from the timing controller 150. When the data driver 120 receives the data drive control signal DCS, it generates data signals and provides the data signals to the data lines D1 to Dm in synchronization with the scan signals.

The timing controller 150 generates a data drive control signal DCS and a scan drive control signal SCS corresponding to synchronous signals supplied from an external apparatus. The data drive control signal DCS generated by the timing controller 150 is provided to the data driver 120, and the scan drive control signal SCS is provided to the scan driver 110. The data drive control signal DCS includes a source start pulse, a source shift clock, and the like.

The pixel unit 130 includes pixels 140, which are disposed at intersections of the scan lines S1 to Sn and the data lines D1 to Dm. When a scan signal is supplied to a scan line, pixels in the scan line are selected. If the pixels receive a data signal while the pixels are selected by the scan signal, the pixels are turned on, and transmit light or emits light, making it possible to display images of predetermined luminance on the pixel unit 130.

The flat panel display of the present invention can be selected as one of displays, which include a data driver 120 for receiving data from an external apparatus and generating an analog voltage, which can be referred to as a data signal. For example, the flat panel display can be a liquid crystal display or an organic light emitting display.

Figure 4:
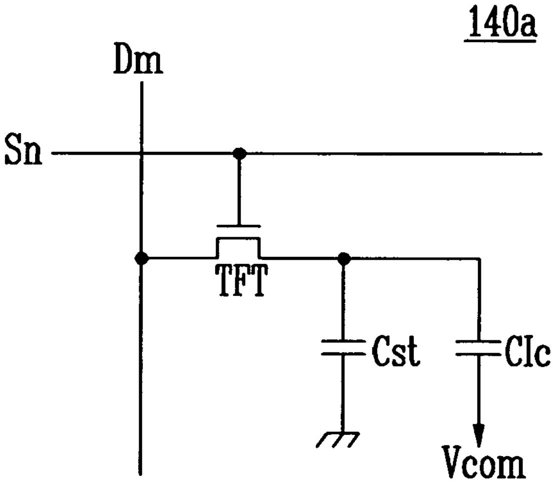
FIG. 4 is a circuit diagram of a pixel in the case that the flat panel display of FIG. 3 includes a liquid crystal display.

FIG. 4 shows a circuit diagram of a pixel in the case that the flat panel display of FIG. 3 includes a liquid crystal display. For convenience of the description, FIG. 4 shows a pixel coupled with an n-th scan line Sn and an m-th data line Dm. Referring to FIG. 4, a pixel 140*a* includes a thin film transistor TFT, a storage capacitor Cst, and a liquid crystal layer C1*c*, which can be represented as a capacitor. The thin film transistor TFT is disposed between the data line Dm and the liquid crystal layer C1*c*, and is controlled by a scan signal supplied from the scan line Sn. The storage capacitor Cst is also coupled to the thin film transistor TFT.

When a scan signal is supplied to the scan line Sn, the thin film transistor TFT is turned on. When the thin film transistor TFT is turned on, a data signal supplied to the data line Dm is transferred to the storage capacitor Cst and the liquid crystal layer C1*c*. When the data signal is supplied to the storage capacitor Cst, it stores a voltage corresponding to the data signal.

The liquid crystal layer C1*c* includes a liquid crystal material disposed between two pixel electrodes, structure of which can be represented as a capacitor, and is coupled to a drain electrode of the thin film transistor TFT and a common electrode Vcom. The liquid crystal layer C1*c* controls an optical transmittance of light.

The diagram of the pixel 140*a* shown in FIG. 4 is an embodiment of the present invention. However, the present invention is not limited thereto. In practice, a structure of the pixel 140*a* can be changed to include more than one thin film transistor TFT.

Figure 5:
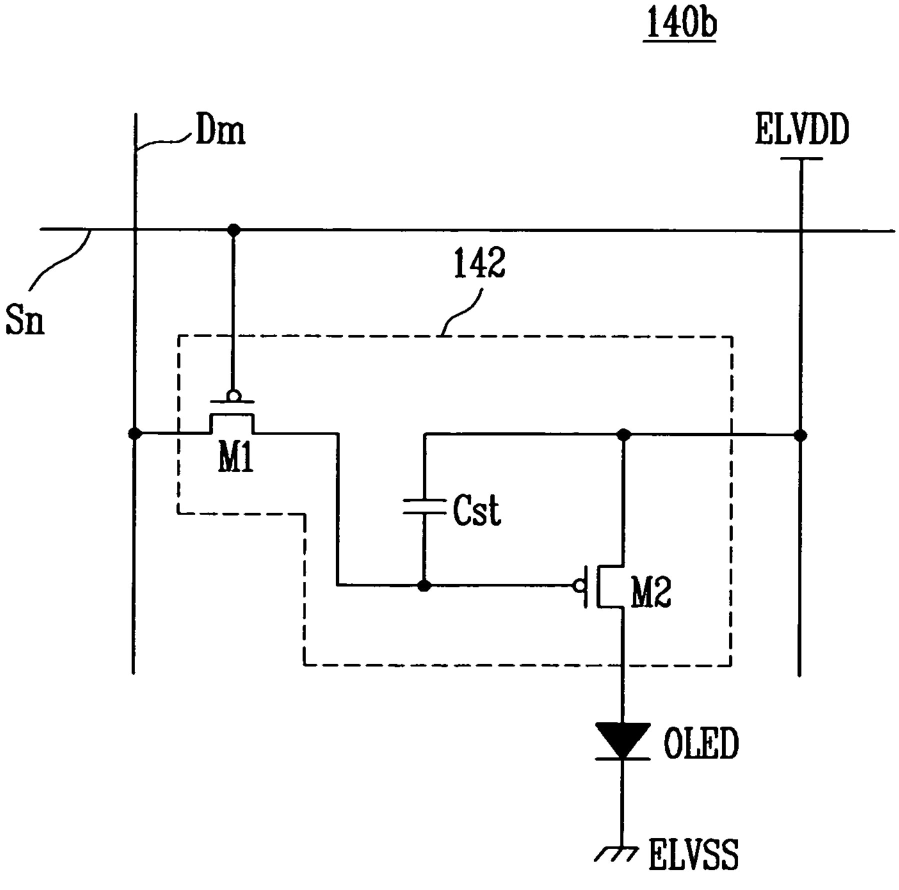
FIG. 5 is a circuit diagram of a pixel in the case that the flat panel display of FIG. 3 includes an organic light emitting display.

FIG. 5 shows a circuit diagram of a pixel in the case that the flat panel display of FIG. 3 includes an organic light emitting display. For convenience of the description, FIG. 5 shows a pixel coupled with an n-th scan line Sn and an m-th data line Dm. With reference to FIG. 5, the pixel 140*b* includes an organic light emitting diode OLED and a pixel circuit 142. The pixel circuit 142 is coupled to the data line Dm and the scan line Sn, and controls switching of the organic light emitting diode OLED.

An anode electrode of the organic light emitting diode OLED is coupled to the pixel circuit 142, and a cathode electrode thereof is coupled with a second power supply ELVSS. The organic light emitting diode OLED generates light with predetermined luminance depending on electric current supplied from the pixel circuit 142.

While a scan signal is supplied to the scan line Sn, the pixel circuit 142 controls amount of electric current supplied to the organic light emitting diode OLED according to a data signal supplied from the data line Dm. In order to control the amount of electric current, the pixel circuit 142 includes a first transistor M1 of the organic light emitting display, a second transistor M2 of the organic light emitting display, and a storage capacitor Cst. The first transistor M1 is coupled 7 between the data line Dm and the second transistor M2. The second transistor M2 is coupled between a first power supply ELVDD and the organic light emitting diode OLED. The storage capacitor Cst is coupled between a gate electrode and a first electrode of the second transistor M2. A gate electrode of the first transistor M1 is coupled to the scan line Sn, and a first electrode thereof is coupled to the data line Dm. Further, a second electrode of the first transistor M1 is coupled with a first terminal of the storage capacitor Cst. The first electrode of the first transistor M1 or the second transistor M2 can be one of a source electrode and a drain electrode. In this case, the second electrode of the first transistor M1 or the second transistor M2 is an electrode that is not the first electrode. For example, if the first electrode is as a source electrode, the second electrode is a drain electrode.

When the scan signal is supplied to the scan line Sn, the first transistor M1 is turned on, having the data signal transferred from the data line Dm to the storage capacitor Cst. At this time, the storage capacitor Cst is charged with a voltage corresponding to the data signal.

A gate electrode of the second transistor M2 is coupled to a first terminal of the storage capacitor Cst, and a first electrode thereof is coupled to a second terminal of the storage capacitor Cst and the first power supply ELVDD. A second electrode of the second transistor M2 is coupled to an anode electrode of the organic light emitting diode OLED. The second transistor M2 controls an amount of electric current flowing from the first power supply ELVDD to the second power supply ELVSS through the organic light emitting diode OLED. The organic light emitting diode OLED generates light corresponding to the amount of electric current supplied through the second transistor M2.

The diagram of the pixel 140*b* shown in FIG. 5 is an embodiment of the present invention. However, the present invention is not limited thereto. The structure of the pixel 140*b* can be changed to include another structure that is capable of emitting light from an organic light emitting diode.

Figure 6:
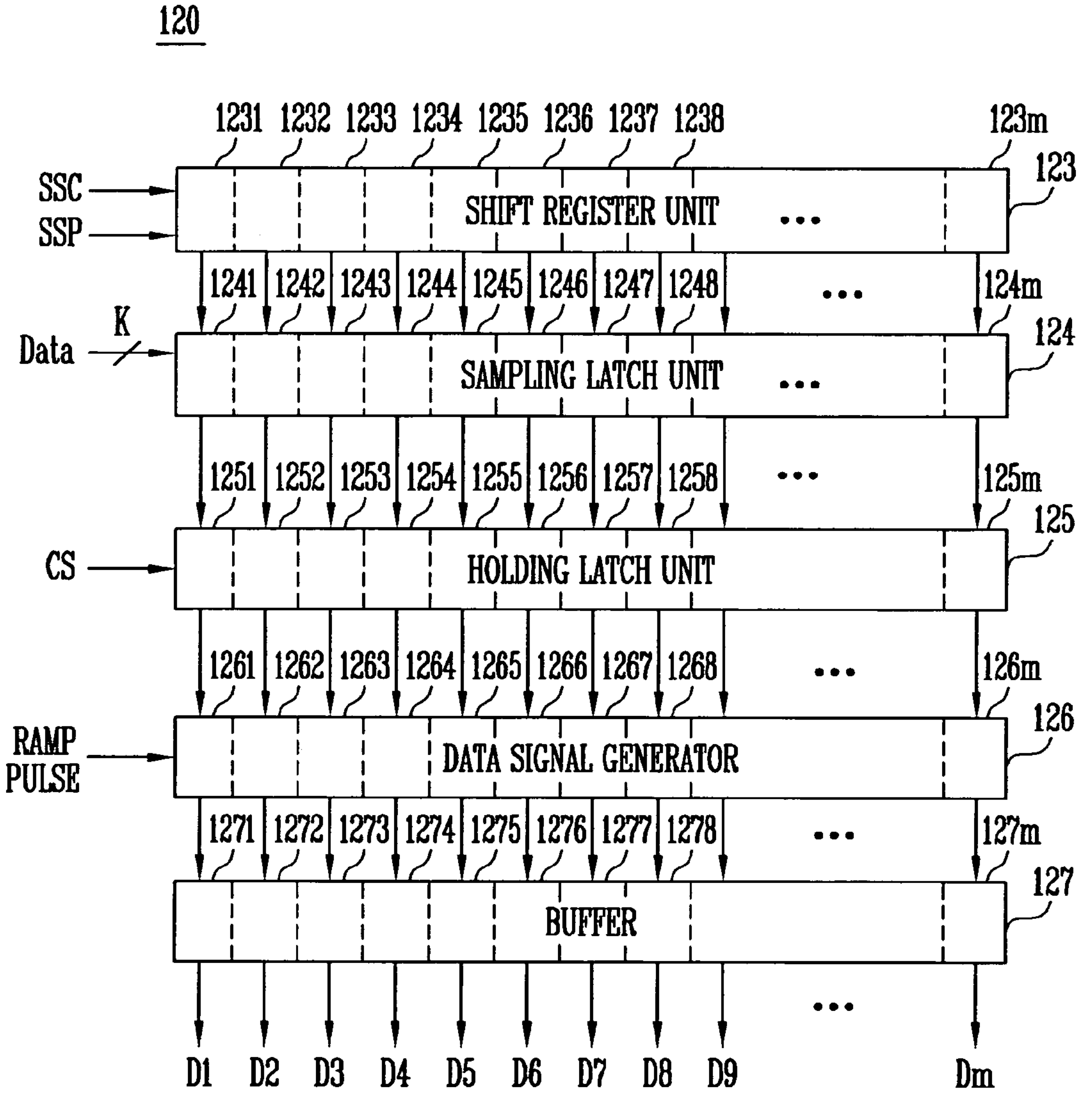
FIG. 6 is a view showing an example of a data driver shown in FIG. 3.

FIG. 6 is a view showing an example of a data driver shown in FIG. 3. For convenience of the explanation, in FIG. 6, it is assumed that the data driver has m channels. Referring to FIG. 6, the data driver 120 of an embodiment of the present invention includes a shift register unit 123, a sampling latch unit 124, a holding latch unit 125, a data signal generator 126, and a buffer 127. The shift register unit 123 sequentially generates a sampling signal. The sampling latch unit 124 sequentially stores data in response to the sampling signal. The holding latch unit 125 receives the data stored in the sampling latch unit 124, and generates a counting signal corresponding to a value of the received data. The data signal generator 126 generates a data signal corresponding to the value of the data. The buffer 127 provides the data signal to the data lines D1 to Dm.

The shift register unit 123 receives a source shift clock SSC and a source start pulse SSP from the timing controller 150 shown in FIG. 3. When the shift register unit 123 receives a source shift clock SSC and a source start pulse SSP, it shifts (or delays) the source start pulse SSP corresponding to the source shift clock SSC to sequentially generate m sampling signals. For this purpose, the shift register unit 123 includes m shifter registers 1231 to 123*m.*

The sampling latch unit 124 sequentially stores data corresponding to the sampling signal sequentially supplied from the shift register unit 123. The sampling latch unit 124 includes m sampling latches 1241 to 124*m* for storing m data. Here, size of each of the sampling latches 1241 to 124*m* can be set to store data of k bits. Examples of the k bits can be 1 bit to 16 bits, but is not limited to this number.

A control signal CS has a polarity: a first polarity or a second polarity. If the holding latch unit 125 receives a control signal CS of a second polarity supplied from the timing controller 150, it receives and stores the data from the sampling latch unit 124. If the holding latch unit 125 receives a control signal CS of a first polarity, the holding latch unit 125 generates a counting signal corresponding to a value of the data inputted to the holding latch unit 125, and provides the counting signal to the data signal generator 126. Size of each of the holding latches 1251 to 125*m* is set to store data of k bits.

The data signal generator 126 receives a ramp pulse from an external apparatus. When the data signal generator 126 receives the ramp pulse, the data signal generator 126 determines a voltage level of a data signal with the voltage level of the ramp pulse at the last moment of the counting signal, and generates a data signal. The data signal is provides to the buffer 127. The data signal generator 126 includes m digital-analog converts 1261 to 126*m*, which are disposed at separate channels.

The buffer 127 provides the data signal form the data signal generator 126 to the data lines D1 to Dm. The buffer 127 can be omitted during the designing. In this case, the data signal generator 126 is coupled to the data lines D1 to Dm.

Figure 7:
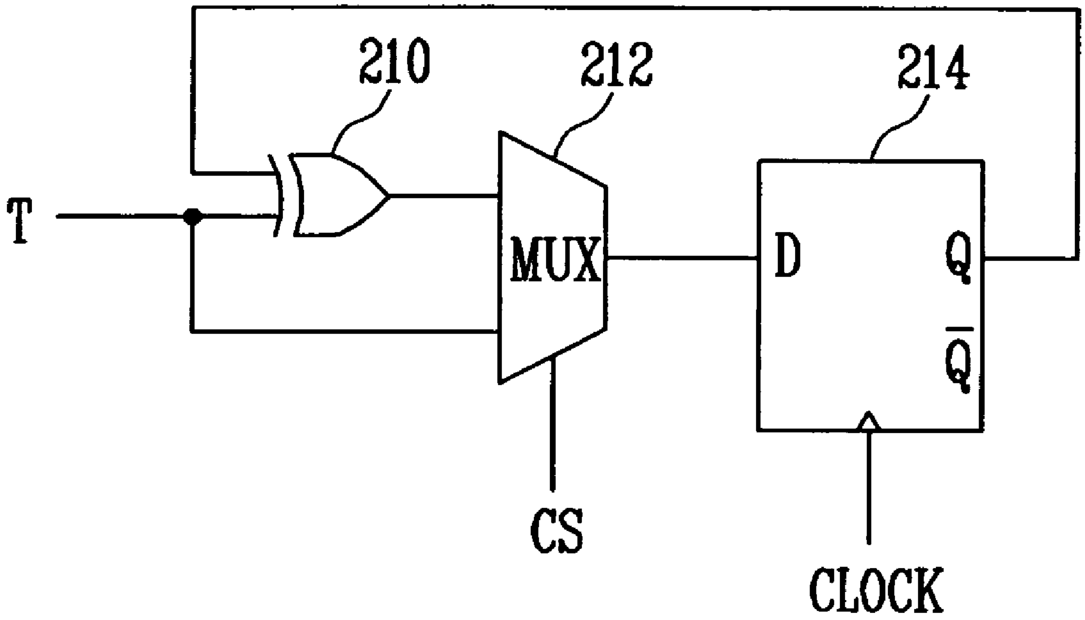
FIG. 7 is a diagram showing a logic unit included in the holding latch unit of an embodiment of the present invention.

FIG. 7 shows a logic unit included in the holding latch unit of an embodiment of the present invention. Prior to explaining the holding latch unit, an operation of the logic unit will be described in detail. With reference to FIG. 7, the logic unit of the present invention functions as a D flip-flop or a T flip-flop depending on a polarity of the control signal CS. The logic unit includes a first logic gate 210, a demultiplexer (referred to as MUX or a first demultiplexer) 212, and a flip-flop unit 214.

If the same value is inputted to two input terminals of the first logic gate 210, the first logic gate outputs "0". If different values are inputted to two input terminals of the first logic gate 210, the first logic gate outputs "1". For example, if "0" and "0," or "1" and "1" are inputted to two input terminals of the first logic gate 210, respectively, the first logic gate outputs "0." By contrast, if "1" and "0," or "0" and "1" are inputted to two input terminals of the first logic gate 210, respectively, the first logic gate outputs "1." In other words, the first logic gate 210 works as an exclusive OR gate.

The MUX 212 couples one of the first logic gate 210 and the input terminal T to the flip-flop unit 214 according to a polarity of the control signal CS. For example, if a control signal CS of a first polarity is inputted to the MUX 212, it couples the first logic gate 210 to the flip-flop unit 214. In contrast, if a control signal CS of a second polarity is inputted to the MUX 212, it couples the input terminal T to the flip-flop unit 214. The flip-flop unit 214 supplies a value from the MUX 212 to an output terminal Q without change.

The following is a detailed description of the logic unit. First, if a control signal CS of a second polarity is inputted to the logic unit, an input terminal T is coupled to the flip-flop unit In this case, since a value inputted to the input terminal T is transferred to the flip-flop unit 214 without change, the logic unit works as a D flip-flop.

If the control signal CS of a first polarity is inputted to the logic unit, the first logic gate 210 is coupled to the flip flop unit 214. If "0" is inputted to the input terminal T, an output terminal Q of the flip-flop unit 214 maintains an output value that is outputted during a previous operation. In detail, when "0" is inputted to the input terminal T and the output terminal Q of the flip-flop unit 214 maintains "0" during a previous operation, the first logic gate 210 outputs "0". Accordingly, an output terminal Q of the flip flop unit 214 maintains "0". If "0" is inputted to the input terminal T and the output terminal Q of the flip-flop unit 214 maintains "1" during a previous operation, the first logic gate 210 outputs "1". Accordingly, an output terminal Q of the flip flop unit 214 maintains "1".

On the other hand, if "1" is inputted to the input terminal T, an output terminal Q of the flip-flop unit 214 outputs a value inverted from a value outputted during a previous operation. In detail, if "1" is inputted to the input terminal T and the output terminal Q of the flip-flop unit 214 maintains "0" during a previous operation, the first logic gate 210 outputs "1". Accordingly, the output terminal Q of the flip-flop unit 214 is inverted to "1". If "1" is inputted to the input terminal T and the output terminal Q of the flip-flop unit 214 maintains "1" during a previous operation, the first logic gate 210 outputs "0." Accordingly, the output terminal Q of the flip-flop unit 214 is inverted to "0."

Therefore, if the control signal CS of a second polarity is inputted to the logic unit of the present invention, the logic unit works as a D flip-flop. By contrast, if the control signal CS of a first polarity is inputted to the logic unit, the logic unit works as a T flip-flop.

Figure 8:
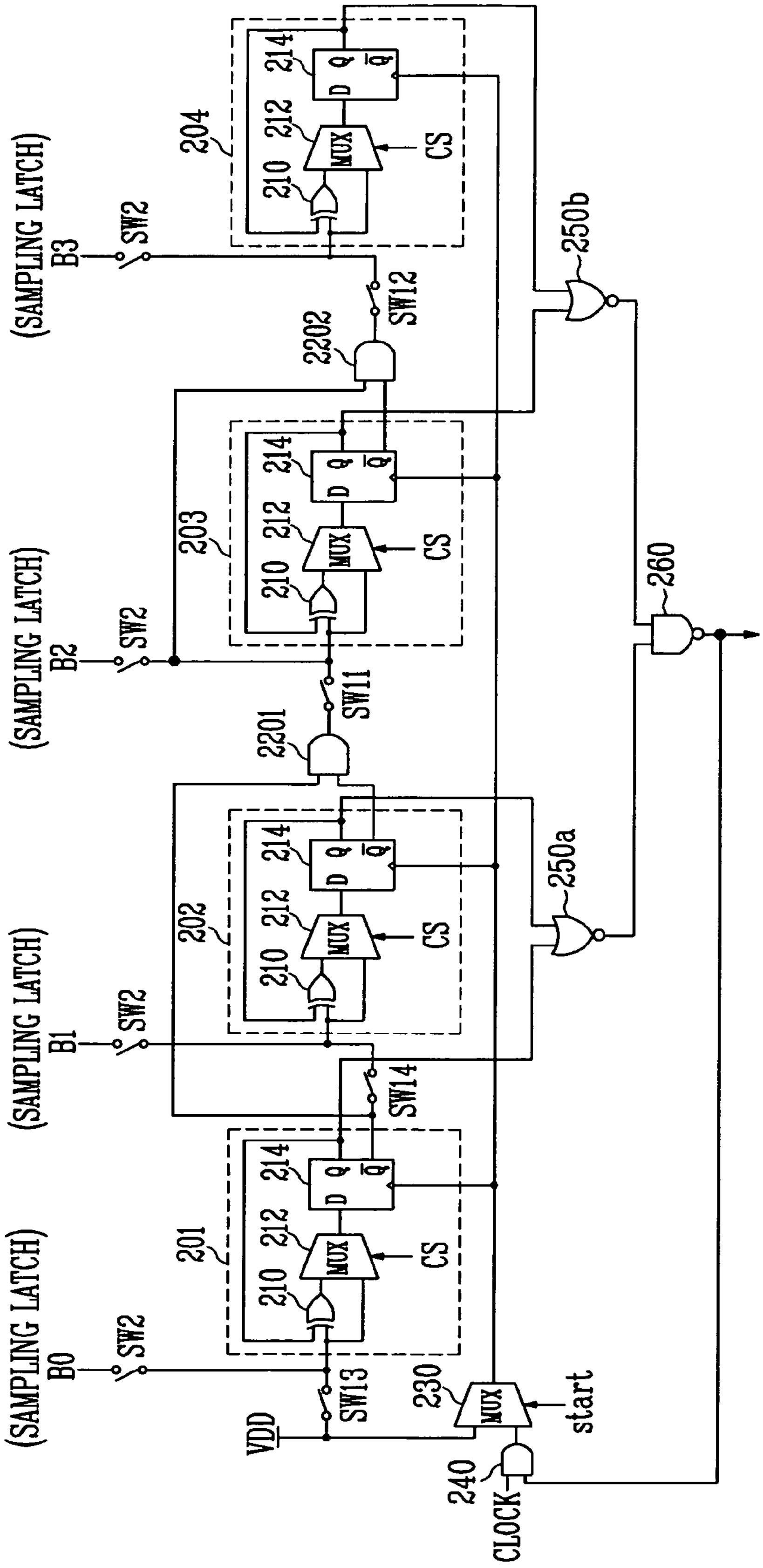
FIG. 8 is a view showing a holding latch included in a holding latch unit that is constructed as an embodiment of the present invention.

FIG. 8 is a view showing a holding latch included in a holding latch unit that is constructed as an embodiment of the present invention. For convenience of the explanation, it is assume that the data size is four bits. Referring to FIG. 8, each of the holding latches 1251 to 125*m*, which are shown in FIG. 6, includes four logic units 201, 202, 203, and 204, which corresponds to the data size (four bits in this example). If data size is eight bits, eight logic units are necessary. Each of the logic units is coupled to a first switch (SW11 to SW14) and a second switch SW2. In order to receive data of four bits, each of the logic units 201, 202, 203, and 204 is installed at each input terminal of bits. Herein, if data is represented in a binary numeral system, the data is represented in an array of bits. A bit value is defined as a value at a bit of the array of bits that represent data. Therefore, a bit value can be "0" or "1." By contrast, a value of data is defined as a number that the data represents. Therefore, value of data is independent of the numeral system.

For example, the first logic unit 201 is coupled to an input terminal of a bit B0 in order to receive a least significant bit (LSB) of the bit B0, which is one of the bits representing the data supplied from sampling latch unit 124. The second logic unit 202 is coupled to an input terminal of a bit B1 in order to receive a bit value of the bit B1. Also, the third logic unit 203 is coupled to an input terminal of a bit B2 in order to receive a bit value of the bit B2 bit. The fourth logic unit 204 is coupled to an input terminal of a bit B3 in order to receive a bit value of the bit B3.

The second switch SW2 is coupled between a logic unit and an input terminal of the logic unit. If a control signal CS of a second polarity is inputted, the second switches SW2 are turned on. Otherwise the second switch is turned off.

A first switch (SW11, SW12, SW13, or SW14) is coupled between two logic units (a j-th logic unit and a (j−1)-th logic unit). The first switch is disposed between an input terminal of the j-th logic unit and an inversion output terminal /Q of the (j−1)-th logic unit. Herein, another output terminal /Q of a logic unit, which is not an output terminal Q, is referred to as an inversion output terminal. The first logic unit includes a third-first switch SW13 coupled between a power source voltage VDD and an input terminal of the first logic unit. If the control signal CS of the first polarity is inputted, all of the first switches SW11 to SW14 are turned on. All of the first switches SW11 to SW14 are turned off if the control signal with another polarity is inputted.

On the other hand, the holding latch of the present invention includes second logic gates (a first-second logic gate 2201 and a second-second 2202), third logic gates 250*a* and 250*b*, a fourth logic gate 260, a fifth logic gate 240, and a MUX 230.

One input terminal of the first-second logic gate (coupled to an LSB) 2201 is coupled to an inversion output terminal /Q of the first logic unit 201, and another input terminal of the first-second logic gate 2201 is coupled to an inversion output terminal /Q of the second logic unit 202. An output terminal of the first-second logic gate 2201 is coupled to a first-first switch SW11 that is coupled to the third logic unit 203. An input terminal of the second-second logic gate 2202 is coupled to an input terminal of the third logic unit 203, and another input terminal of the second-second logic gate 2202 is coupled to an inversion output terminal /Q of the third logic unit 203. An output terminal of the second-second logic gate 2202 is coupled to the second-first switch SW12 that is coupled to the fourth logic unit 204.

If there are a plurality of second logic gates, except for the first-second logic gate 2201, input terminals of other second logic gates, which is disposed between p-th logic unit and (p+1)-th logic unit, are coupled with an input terminal of the p-th logic unit and an inversion output terminal /Q of the p-th logic unit (p is a natural number except for 1 and 2), respectively. Output terminals the second logic gate (2201 or 2202), which is disposed between p-th logic unit and (p+1)-th logic unit, are coupled to the first switch that is coupled to the (p+1)-th logic unit. The second logic gates 2201 and 2202 work as an AND gate. On the other hand, FIG. 8 shows the second two logic gates 2201 and 2202 since it is assumed that the data has 4 bits. However, the present invention is not limited thereto. The data can have more or less than 4 bits. For example, if the data has 8 bits, eight second-second logic gates 2202 are necessary, if the data has 2 bits, two second-second logic gates 2202 are necessary.

An input terminal of the third logic gate (a first-third logic gate 250*a* or a second-third logic gate 250*b*) is coupled to an output terminal Q of a logic unit, and another input terminal of the third logic gate is coupled to an output terminal Q of another logic unit. An output terminal of the third logic gate (250*a* or 250*b*) is coupled to an input terminal of the fourth logic gate 260. The third logic gate (250*a* and 250*b*) works as a NOR gate.

An input terminal of the fourth logic gate 260 is coupled to an output terminal of a first-third logic gate 250*a*, and another input terminal of the fourth logic gate 260 is coupled to an output terminal of a second-third logic gate 250*b*. An output terminal of the fourth logic gate 260 is coupled to the data signal generator 126. The fourth logic gate 260 works as an NAND gate.

The fifth logic gate 240 receives an output from the fourth logic gate 260 and a clock signal CLOCK as inputs, and performs an logic AND operation with the received inputs. The fifth logic gate 240, then, provides the result of the AND operation to the second multiplexer 230. The fifth logic gate 240 works as an AND gate.

The second multiplexer 230 receives a power source voltage VDD and an output of the fifth logic gate 240, and provides one of the power source voltage VDD and the output of the fifth logic gate 240 to logic units 201, 202, 203, and 204 as a clock signal. When a START signal is inputted to the second multiplexer 230, it outputs the power source voltage VDD as a clock signal. In the other case, the second multiplexer 230 provides an output of the fifth logic gate 240 as the clock signal. The START signal is supplied during a time period in which the logic units operate as D flip-flips and stores bits of the data.

The description referring to FIG. 8 is based on an assumption that the data size is four bits. However, the present invention is not limited thereto. For example, when the data is set to have eight bits, eight logic units can be installed.

Figure 9:
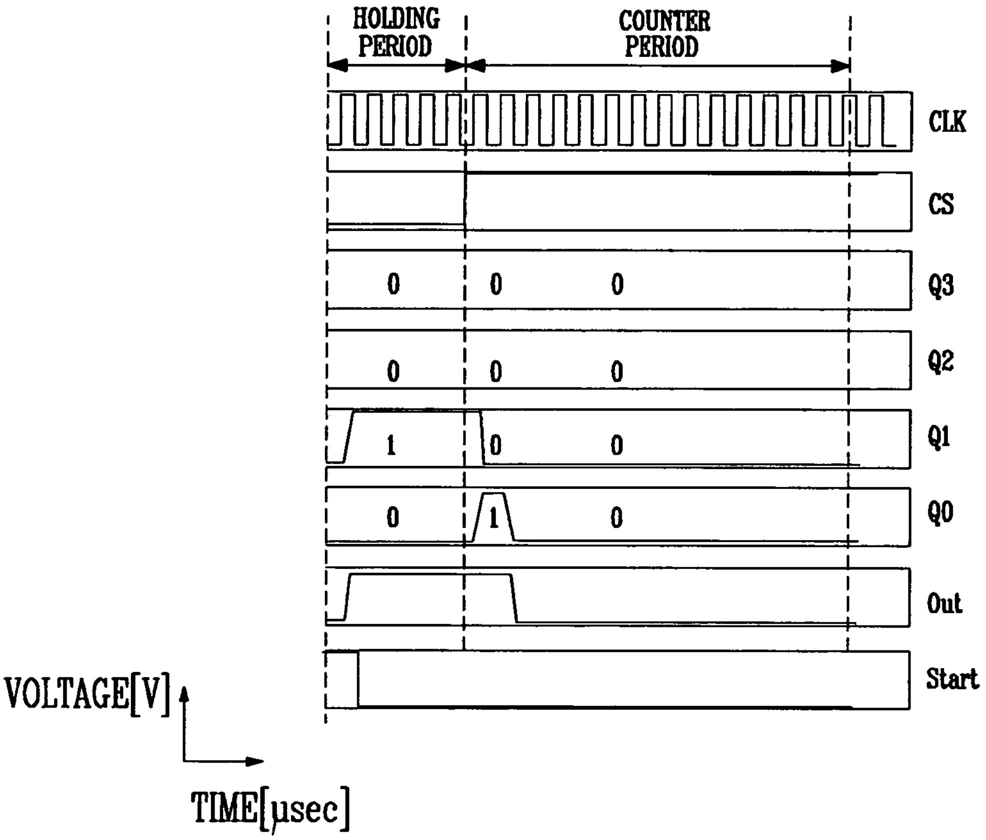
FIG. 9 is a waveform diagram illustrating an operation of the holding latch of FIG. 8.

FIG. 9 is a waveform diagram illustrating an operation of the holding latch of FIG. With reference to FIG. 8 and FIG. 9, if the control signal CS is set to have a second polarity, the second switches SW2 are turned on, but the first switches SW11 to SW14 are turned off. Further, if the control signal CS of the second polarity is supplied, a first multiplexer 212 of each of the logic units 201, 202, 203, and 204 electrically connects the flip-flop unit 214 of each of the logic units to each of second switches SW2 that are connected to each of the logic units. In this case, each of the logic units 201, 202, 203, and 204 operates as a D flip-flop. Q0 is an output of the flip-flop unit 214 included in the first logic unit 201. Q1 is an output of the flip-flop unit 214 included in the second logic unit 202. Q2 is an output of the flip-flop unit 214 included in the third logic unit 203. Q3 is an output of the flip-flop unit 214 included in the fourth logic unit 204.

Moreover, when the second switches SW2 are turned on, the START pulse is supplied to the second multiplexer 230, and the power source voltage VDD is supplied to a second multiplexer 230. Accordingly, a clock signal CLOCK is supplied to the flip-flops unit 214 of each of the logic units 201, 202, 203, and 204. Consequently, bit value of the data supplied through each of the second switches SW2 is stored or reserved in the flip-flops unit 214 of each of the logic units. For convenience of the description, it is assumed that data of "0010" is supplied.

When the data of "0010" is supplied to the holding latch, a bit of "0" (the last bit) is stored in the first logic unit 201, and a bit of "1" (the second last bit) is stored in the second logic unit 202. Further, a bit of "0" is stored in the third logic unit 203, and a bit of "0" is stored in the fourth logic unit 204. The first-third logic gate 250*a* outputs "0", while the second-third logic gate 250*b* outputs "1". Accordingly, the fourth logic gate 260 outputs "1." After the fourth logic gate 260 outputs "1", a supply of the start signal START stops, and an output of the fifth logic gate 240 is supplied as a clock signal. In this case, the control signal CS is set with a second polarity to store bit values of the data in the logic units 201, 202, 203, and 204.

If the control signal CS is changed to have the first polarity, the second switches SW2 are turned off, and the first switches SW11 to SW14 are turned on. Further, because the first multiplexer 212 of each of the logic units is coupled to the first logic gate 210 of each of the logic units, the logic units 201, 202, 203, and 204 operate as a T flip-flop. Because the logic units 201, 202, 203, and 204 operate as the T flip-flop, they operate as a down counter.

In detail, because the power source voltage VDD, which can be represented as having a value of "I," is supplied to the first logic unit 201, the fist logic unit 201 receives the value of "1." While the third-first switch SW13 is being turned off, no power source voltage VDD is supplied to the first logic unit 201. In this case, it is equivalent that the fist logic unit 201 receives a value of "0." Since the second logic unit 202 is coupled to an inversion output signal /Q of the first logic unit 201, it receives a value of "1", and accordingly, outputs a value of "0".

When the first-second logic gate 2201 receives values of "1" and "0", it outputs a value of "0". Accordingly, the third logic unit 203 maintains "0", which is a previous value. When the second-second logic gate 2202 receives values of "0" and "1", it output a value of "0". Accordingly, the fourth logic unit 204 maintains "0", which is a previous value. According to the aforementioned results, the logic units 201, 202, 203, and 204 output values of "1", "0", "0", and "0", respectively.

The first-third logic unit 250*a* receiving the outputs of the first and second logic units 201 and 202 outputs "0." The second-third logic unit 250*b* receiving the outputs of the third and fourth logic units 203 and 204 outputs "1." Furthermore, the fourth logic gate 260 receiving "0" and "1" outputs a signal of "1". An output of the fourth logic gate 260 is supplied to the data signal generator 126 as a counting signal.

Next, the first logic unit 210 inverts and outputs a value of "1" to a value of "0" corresponding to an input of the power source voltage. The second logic unit 202 to the fourth logic unit 204 receive a value of "0" and maintains a previous value. According to the aforementioned results, the logic units 201, 202, 203, and 204 output values of "0", "0", "0", and "0", respectively.

At this time, the third logic gates 250*a* and 250*b* output a value of "1." Further, the fourth logic unit 260 having received a value of "1" outputs a signal of "0." When a signal of "0" is supplied, it indicates that a supply of the counting signal stops. On the other hand, since a value of "0" outputted from the fourth logic gate 260 is supplied to the fifth logic gate 240, the fifth logic unit 240 outputs a value of "0," thereby stopping a supply of the clock signal to the logic units 201, 202, 203, and 204. Consequently, until a next data is inputted, the fourth logic unit 260 continuously supplies a value of "0."

On the other hand, in the present invention, the second multiplexer 230 and the fifth logic gate 240 can be removed depending on a structure of the data signal generator 126. When the second multiplexer 230 and the fifth logic gate 240 are removed, the clock signal is directly supplied to the flip-flop unit 214 of each of the logic units. In this case, the fourth logic gate 260 firstly outputs a signal of "1," and outputs a signal of "0" at a corresponding time of a value of the data. Further, after outputting the signal of "0," the fourth logic gate 260 again outputs the signal of "1." In other words, the fourth logic gate 260 outputs the signal of "0" at a specific time corresponding to the value of the data, and outputs the signal of "I" in another case.

Figure 10:
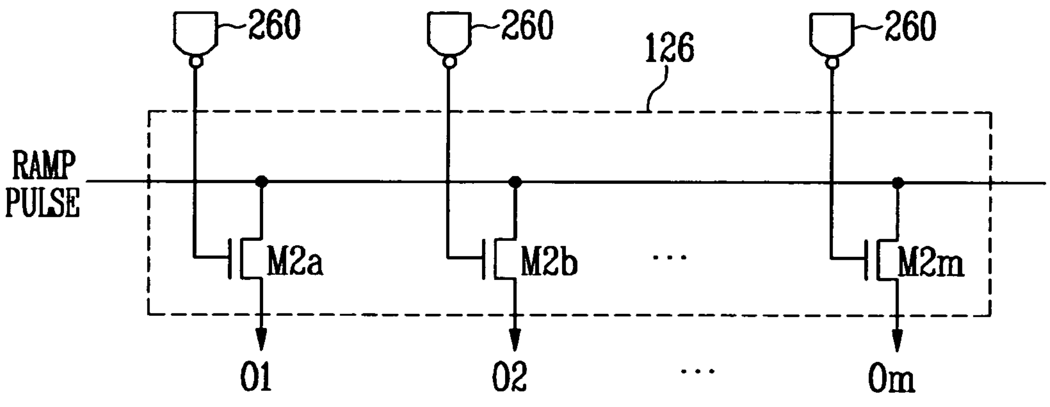
FIG. 10 is a view showing a digital-analog converter according to an embodiment of the present invention.

FIG. 10 is a view showing a digital-analog converter included in the data signal generator of an embodiment of the present invention. With reference to FIG. 10, the data signal generator 126 includes first transistors M2*a*, M2*b*, . . . , M2*m*, which are disposed at separate channels. When the counting signal is supplied to the first transistors M2*a*, M2*b*, . . . , M2*m* from holding latches of the holding unit 125, the transistors are tuned on to provide an external ramp pulse to the output terminals O1, O2, . . . Om. The output terminals O1, O2, . . . , Om are coupled to the data line D1, D2, . . . Dm shown in FIG. 3, respectively. Because the moment for stopping the supply of the counting signal is determined by the value of the data, the generation of the data signal also depends on the value of the data.

Figure 2A:
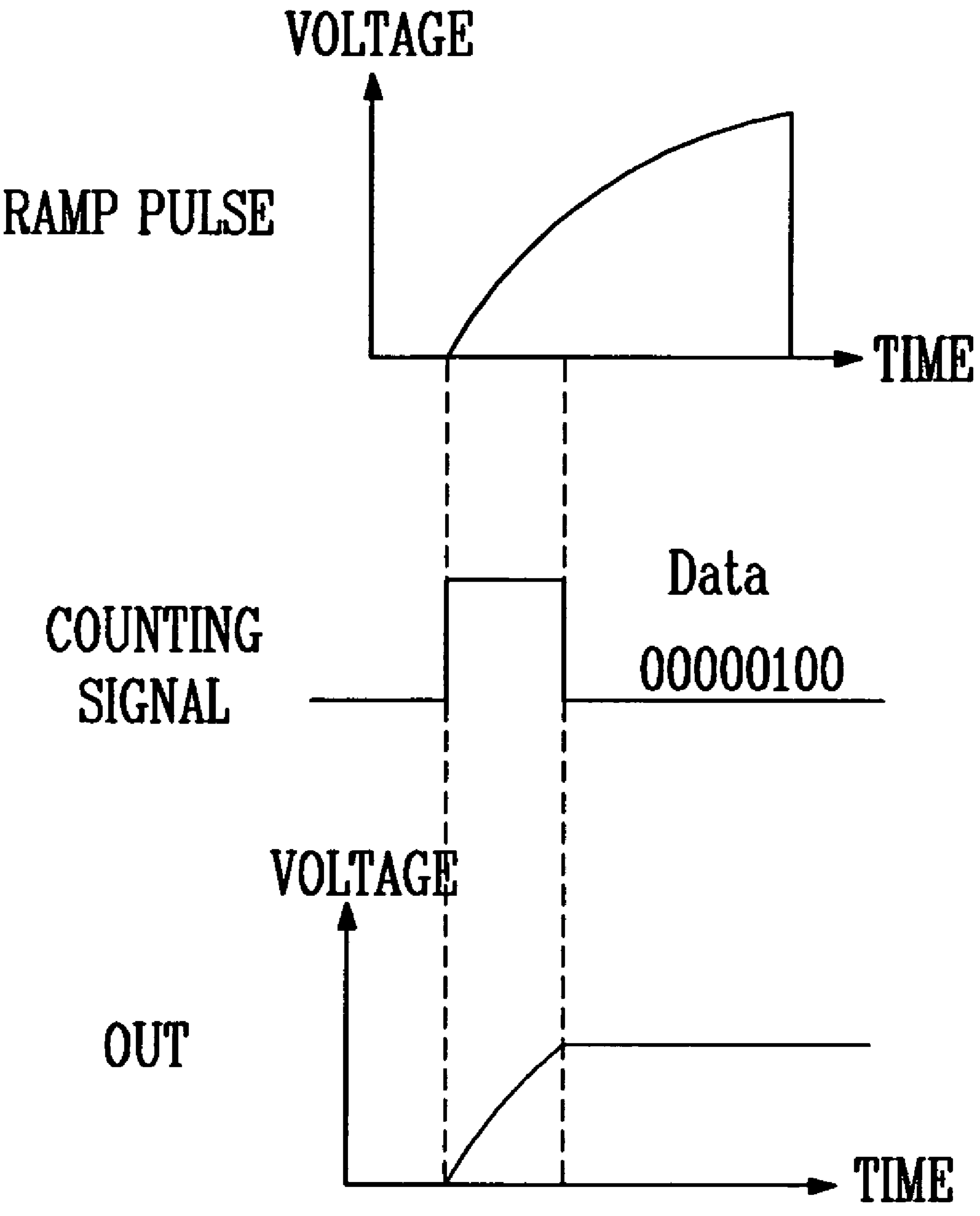
FIG. 2A and FIG. 2B are graphs showing a drive operation of the data driver shown in FIG. 1.
Figure 2B:
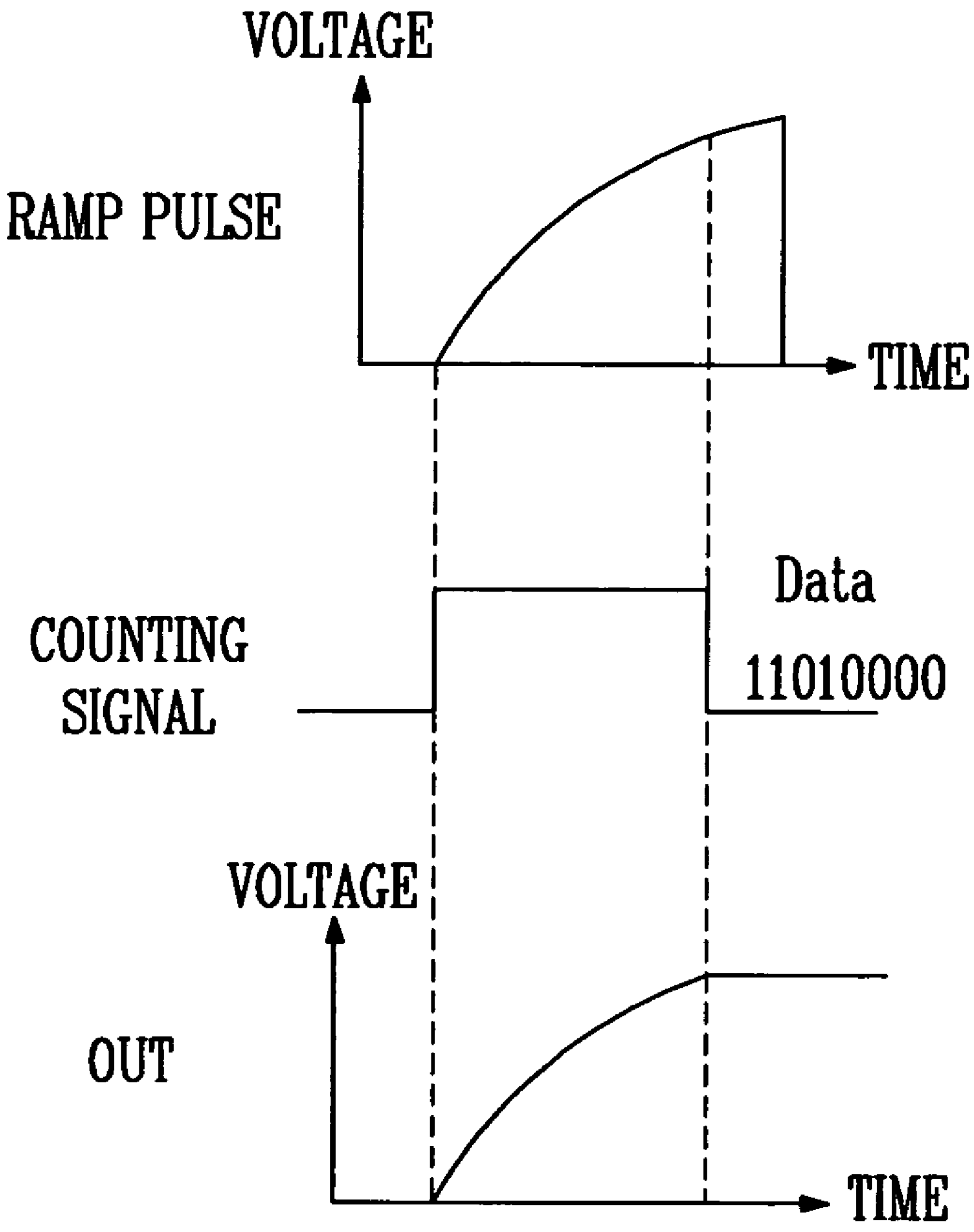

In the operation, the counting signal is supplied from the fourth logic gate 260 of each of holding latches 1251 to 125*m*. When the counting signal is supplied, the first transistors M2*a*, M2*b*, . . . , M2*m* are tuned on. The supply of the counting signal stops according to the value of the data supplied from the respective holding latches 1251 to 125*m*. Stop or supply of the counting signal is determined by the value of the data, and therefore the data signal is generated corresponding to the value of bits of the data. When the supply of the counting signal stops, one of the first transistors M2*a*, M2*b*, . . . , M2*m*, which received the counting signal, is turned off. Accordingly, a voltage level of the ramp pulse corresponding to the value of the data is supplied to the data line as a data signal. The voltage supplied to the data lines D1, D2, . . . Dm is set as a voltage corresponding to the value of the data among the ramp pulse. This principles are explained referring to FIG. 2A and FIG. 2B.

As is clear from the forgoing description, in the data driver and a flat panel display according to the embodiment of the present invention, by using the logic unit included in the holding latch, since the data are stored or a counting signal is generated corresponding to the stored data, a count can be omitted. Therefore, the present invention may reduce an area of a data driver. Furthermore, since the counter is omitted, a circuit is simplified to secure the reliability.

Although a few embodiments of the present invention have been shown and described, it would be appreciated by those skilled in the art that changes might be made in this embodiment without departing from the principles and spirit of the invention, the scope of which is defined in the claims and their equivalents.

What is claimed is:

1. A data driver generating a data signal to drive a flat panel display, the data driver comprising:

a holding latch for receiving data for the data driver and for receiving a control signal, the holding latch storing the data and outputting a counting signal that is generated according to the value of the data, the holding latch comprising:

a plurality of logic units, each of the logic units including an input terminal, an output terminal and an inversion output terminal, each of the logic units receiving a bit value of the data through the input terminal; and a first-first switch coupled between an inversion output terminal of a first one of the logic units and an input terminal of a second one of the logic units, the first-first switch being turned on if the control signal includes a first polarity; and a digital-analog converter for receiving a ramp pulse and the counting signal, the digital-analog converter determining a voltage level of the data signal from the ramp pulse during a period for which the counting signal is supplied.

2. The data driver as claimed in claim 1, wherein each of the logic units operates as a D flip-flop or a T flip-flop depending on the control signal.

3. The data driver as claimed in claim 2, wherein each of the logic units comprises:

a flip-flop unit;

a first logic gate, a first input terminal of the first logic gate being coupled to an output terminal of the flip-flop unit, a second input terminal of the first logic gate being coupled to the input terminal of the each of the logic units; and a first demultiplexer being coupled to an output terminal of the first logic gate and the input terminal of the each of the logic units, the first demultiplexer outputting an output from the first logic gate or an output from the input terminal of the each of the logic units depending on a polarity of the control signal, an output terminal of the first demultiplexer being coupled to the flip-flop unit.

4. The data driver as claimed in claim 3, wherein the first demultiplexer is switched to output the output from the input terminal of the each of the logic units if the control signal includes a second polarity.

5. The data driver as claimed in claim 4, wherein the each of the logic unit stores the bit value of the data if the control signal includes the second polarity.

6. The data driver as claimed in claim 3, wherein the first demultiplexer is switched to output the output from the output terminal of the first logic gate if the control signal includes a first polarity.

7. The data driver as claimed in claim 6, wherein the holding latch outputs a counting signal if the control signal includes the first polarity.

8. The data driver as claimed in claim 7, wherein the holding latch stops outputting the counting signal if all bit values of the data have "0."

9. The data driver as claimed in claim 3, wherein the first logic gate includes an exclusive OR gate.

10. The data driver as claimed in claim 3, wherein the holding latch comprises:

a second switch coupled to an input terminal of the first one of the logic units, the input terminal of the first one of the logic units receiving the bit value of the data through the second switch;

a second-first switch coupled between an inversion output terminal of the second one of the logic units and an input terminal of a third one of the logic units, the second-first switch being turned on if the control signal includes a first polarity;

a first-second logic gate coupled between the inversion output terminal of the first one of the logic units and the first-first switch;

a second-second logic gate coupled between the inversion output terminal of the second one of the logic units and the second-first switch;

a first-third logic gate coupled to an output terminal of the first one of the logic units and to an output terminal of a fourth one of the logic units;

a second-third logic gate coupled to an output terminal of the second one of the logic units and to an output terminal of the third one of the logic units; and a fourth logic gate coupled to an output terminal of the first-third logic gate and to an output terminal of the second-third logic gate.

11. The data driver as claimed in claim 10, wherein the first-second logic gate has a first input terminal and a second input terminal, the first input terminal of the first-second logic gate being coupled to the inversion output terminal of the first one of the logic units, the second input terminal of the first-second logic gate being coupled to an inversion output terminal of the fourth one of the logic units, the first-second logic gate having an output terminal that is coupled to the first-first switch, the first-second logic gate including an AND gate.

12. The data driver as claimed in claim 11, wherein the first one of the logic units stores a least significant bit of the data.

13. The data driver as claimed in claim 11, wherein the holding latch comprises a third-first switch coupled between an input terminal of a fourth one of the logic units and a power source, the third-first switch being turned on if the control signal includes a first polarity.

14. The data driver as claimed in claim 11, wherein the second-second logic gate has a first input terminal and a second input terminal, the first input terminal of the second-second logic gate being coupled to the inversion output terminal of the second one of the logic units, the second input terminal of the second-second logic gate being coupled to the input terminal of a second one of the logic units, the second-second logic gate having an output terminal that is coupled to the second-first switch, the second-second logic gate including an AND gate.

15. The data driver as claimed in claim 10, wherein each of the first-third logic gate and the second-third logic gate includes a NOR gate.

16. The data driver as claimed in claim 10, wherein the fourth logic gate includes a NAND gate.

17. The data driver as claimed in claim 16, wherein the fourth logic gate generates the counting signal if the control signal includes the first polarity.

18. The data driver as claimed in claim 10, wherein the holding latch comprises:

a fifth logic gate for receiving an output from an output terminal of the fourth logic gate and for receiving a clock signal, the fifth logic gate including an AND gate; and a second demultiplexer for receiving an output from a power source and an output of the fifth logic gate, the second demultiplexer receiving a start signal, the second demultiplexer outputting the output from the power source or the output of the fifth logic gate to the flip-flop unit included in the first one of the logic units depending on the start signal.

19. The data driver as claimed in claim 18, wherein the start signal is supplied to the second demultiplexer during a time period in which the second switch is being turned on, the second demultiplexer outputting the output from the power source while the start signal is supplied, the second demultiplexer outputting the output of the fifth logic gate if the start signal is not supplied.

20. The data driver as claimed in claim 1, wherein the digital-analog converter includes a transistor, a ramp pulse being supplied to a first terminal of the transistor and the counting signal being supplied to a gate of the transistor, the transistor being turned on while the counting signal is supplied making the ramp pulse output through a second terminal of the transistor.

21. The data driver as claimed in claim 1, further comprising:

a shift register unit for sequentially generating a sampling signal;

a sampling latch unit for sequentially storing data corresponding to the sampling signal, and for providing the stored data to the haling holding latch unit; and a buffer coupled to the data signal generator.

22. A flat panel display comprising:

a pixel unit for displaying an image;

a scan driver for supplying a scan signal to the pixel unit;

a data driver for supplying a data signal to the pixel unit, the data driver comprising:

a holding latch for receiving data for the data driver and for receiving a control signal, the holding latch storing the data and outputting a counting signal that is generated according to the value of the data, the holding latch comprising:

a plurality of logic units, each of the logic units including an input terminal, an output terminal and an inversion output terminal, each of the logic units receiving a bit value of the data through the input terminal; and a first-first switch coupled between an inversion output terminal of a first one of the logic units and an input terminal of a second one of the logic units, the first-first switch being turned on if the control signal includes a first polarity; and a digital-analog converter for receiving a ramp pulse and the counting signal, the digital-analog converter determining a voltage level of the data signal from the ramp pulse during a period for which the counting signal is supplied.

23. The flat panel display as claimed in claim 22, wherein each of the logic units comprises:

a flip-flop unit;

a first logic gate, a first input terminal of the first logic gate being coupled to an output terminal of the flip-flop unit, a second input terminal of the first logic gate being coupled to the input terminal of the each of the logic units; and a first demultiplexer being coupled to an output terminal of the first logic gate and the input terminal of the each of the logic units, the first demultiplexer outputting an output from the first logic gate or an output from the input terminal of the each of the logic units depending on a polarity of the control signal, an output terminal of the first demultiplexer being coupled to the flip-flop unit.

* * * * *